Nov. 3, 1931.  S. DANIELS  1,830,093

WATER COOLED STRAINER RECEPTACLE

Filed May 29, 1930

Inventor:
Samuel Daniels,
By Spear Middleton Donaldson & Hall
Attys.

Patented Nov. 3, 1931

1,830,093

UNITED STATES PATENT OFFICE

SAMUEL DANIELS, OF HARDWICK, VERMONT, ASSIGNOR TO SAM DANIELS MFG. CO., INC., OF HARDWICK, VERMONT, A CORPORATION OF VERMONT

WATER COOLED STRAINER RECEPTACLE

Application filed May 29, 1930. Serial No. 457,453.

My present invention relates to improvements in milk cooling and straining devices and aims to provide an extremely simple, economical, and durable device capable of use in straining milk while it is being discharged into a can or analogous receptacle, and one in which the milk will be cooled in a novel and efficient manner. With these and other objects in view the invention comprises the novel construction hereinafter described and defined by the appended claims.

The embodiment of the invention is illustrated in the accompanying drawings in which Figure 1 is a central vertical section (partly in elevation) showing my improved cooler and strainer in position on a milk can.

Figure 1:
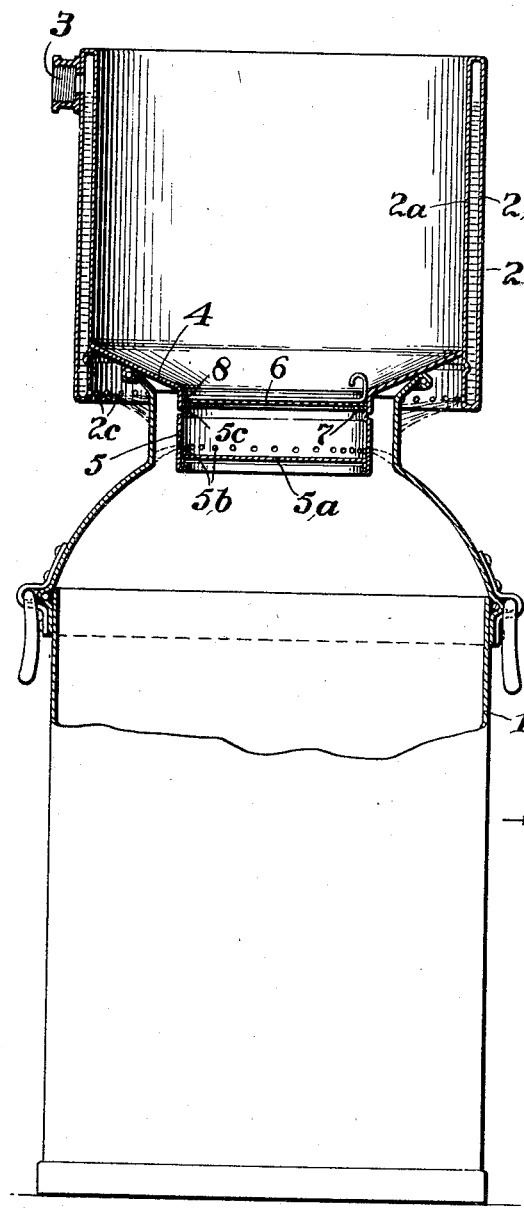
Figure 2:
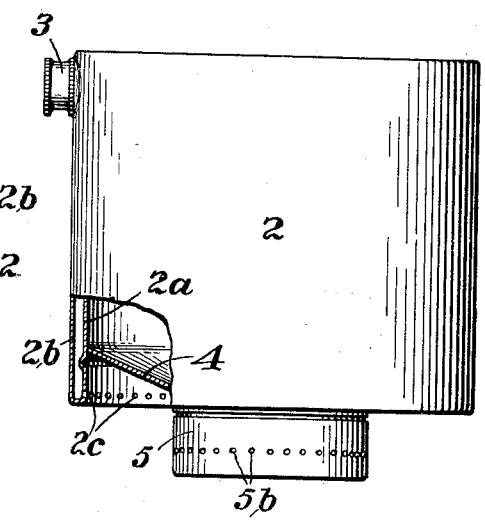
Fig. 2 is a side elevation of the strainer and cooler removed with a portion in section.
Figure 3:
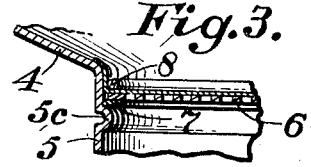
Fig. 3 is an enlarged fragmentary detail of the strainer portion.
Figure 4:
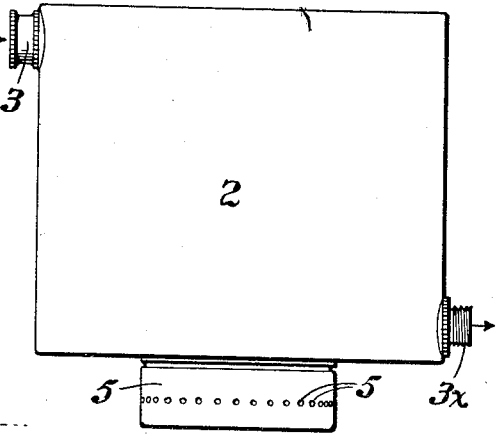
Fig. 4 is an elevation showing a modification.

Referring by reference characters to these drawings, the numeral 1 designates a milk can or other receptacle into which the milk is to be poured by the use of my combined strainer and cooler. This comprises a substantially cylindrical body portion designated by the numeral 2 which is formed of spaced apart inner and outer walls 2a and 2b forming therebetween an annular space or chamber for the reception of a cooling liquid such as cold water to which such cold water may be supplied in any suitable manner or from any suitable source by a flexible pipe (not shown) connected to the coupling nipple 3. The body portion 2 has an annular bottom or shelf portion 4 connected at its outer edge to the inner wall 2a above the bottom edge thereof and connected at its inner edge to a substantially cylindrical portion 5 of a diameter adapted to fit within the mouth of the milk receptacle when the body portion 2 is applied to the can or receptacle with the bottom or shelf 4 resting on the upper edge of the mouth of the can. Preferably the wall 4 inclines downwardly from the wall 2a towards the wall portion 5 to facilitate the placing and holding of the strainer and cooler in concentric relation to the cam. The portion 5 is provided with a closed bottom 5a and an annular series of milk exit orifices 5b in its annular wall just above and preferably closely adjacent to said bottom through which the milk, poured into the body 2, is directed in a plurality of fine streams against the interior wall of the mouth of the can or receptacle. The inner wall of the portion of the body 2 which depends below the inclined bottom or shelf portion 4 is provided with a plurality of orifices arranged in annular formation and indicated at 2c whereby a plurality of streams of cooling liquid are directed against the outside of the can. It will thus be seen that the milk poured into the member 2 will be sprayed against the inner wall of the can and tends to flow down in proximity to said wall while at the same time the said wall will be kept cool by the cooling liquid which issues from the orifices 2c, the said liquid flowing down the outside of the can.

While the described apparatus is capable of being used solely as a cooler it is preferred to embody it in a combined strainer and cooler as shown. For this purpose I provide the strainer 6 spaced from the body of the can and to support this I form the wall 5 with an internal bead 5c and solder to the wall above said bead a ring 7 having its lower surface resting on the bead and on the upper face of which the strainer 6 rests which may be of any desired form such, for example, as a sheet metal plate provided with a plurality of fine strainer openings removably held in place against displacement by a spring clamping ring 8. The form of strainer, however, is immaterial as any desired form may be used.

The above described device has been found in use to be extremely efficient. The cooler and strainer being placed on top of a large milk can and a hose from the water pipe supply connected to the nipple 3, the cold water circulates around through the hollow wall and out through the holes 2c onto the outside of the can. The milk poured into the body 2 in its warm condition and at approximately 90 degrees F. is subjected to the cooling action of the water in the hollow walls and after passing through the strainer is subjected to a further cooling action by being sprayed on the inside of the can wall which is cooled by the water sprayed on the outside. I have found that by a device such as described forty quarts of milk can be strained and cooled in ten or fifteen minutes.

Some farmers do not care to have water running on the outside of the can and prefer to place the can in a water tank. For such use I provide the hollow wall with an outlet nipple 3x on the lower part of the opposite side of the cooler from the inlet nipple 3, to which a waste pipe may be connected.

In such form the discharge orifices 2c are dispensed with.

Having thus described my invention, what I claim is:

1. A milk cooling and pouring device for a milk receptacle, comprising a pouring hopper having a portion of reduced diameter adapted to depend within the receptacle and provided with a closed bottom and annularly arranged discharge orifices in its peripheral wall above said bottom directed laterally outwardly towards the wall of the milk receptacle, said hopper having a hollow wall with the lower portion of the wall depending without the receptacle, said hollow wall having means for admitting cooling liquid thereto and its depending wall having discharge orifices directed laterally inwardly towards the said wall of the milk receptacle, said inwardly facing cooling liquid orifices being disposed above said outwardly facing milk discharge orifices.

2. Apparatus according to claim 1 in which the reduced depending portion is connected to the hollow wall by an annular bottom portion of truncated cone shape.

3. A milk cooler comprising a substantially cylindrical body having a hollow wall and a bottom elevated above the lower edge of said wall to provide a depending annular flange, said bottom having a substantially cylindrical portion depending therefrom concentric with said flange and having a closed bottom, said depending portion having peripheral milk discharge orifices for discharging milk outwardly, said cylindrical body having means for admitting cooling liquid thereto and said depending flange having liquid discharge orifices in its inner wall.

In testimony whereof, I affix my signature.

SAMUEL DANIELS.